H. S. GRACE.
RESILIENT VEHICLE WHEEL.
APPLICATION FILED AUG. 1, 1921.

1,437,137.

Patented Nov. 28, 1922.
2 SHEETS—SHEET 1.

INVENTOR
H.S. Grace.
BY
his ATTORNEYS

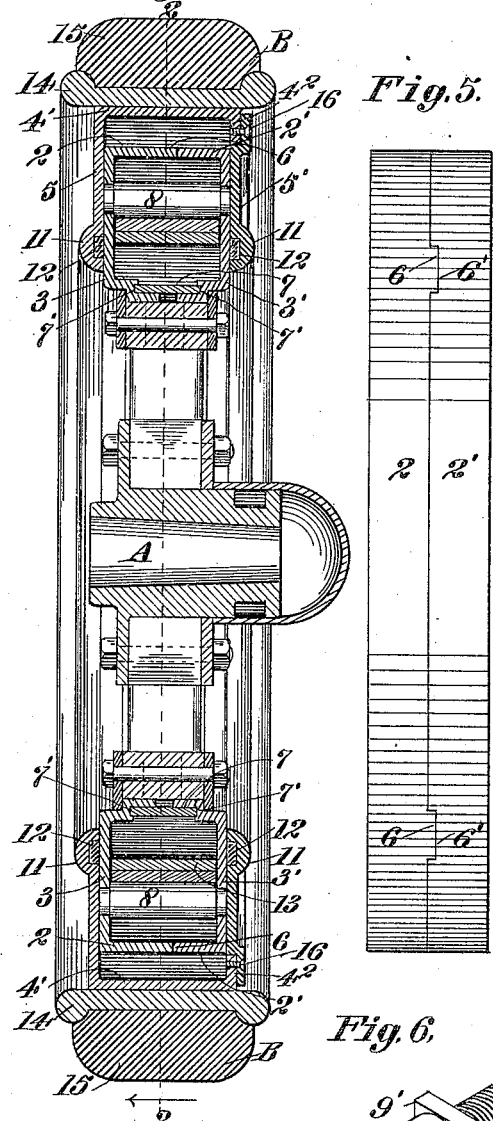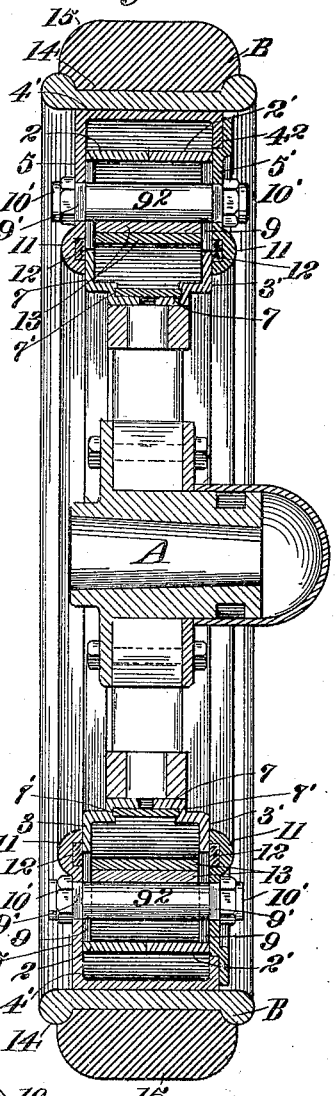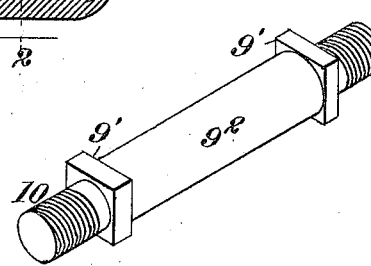

Patented Nov. 28, 1922.

1,437,137

UNITED STATES PATENT OFFICE.

HENRY S. GRACE, OF SAN FRANCISCO, CALIFORNIA.

RESILIENT VEHICLE WHEEL.

Application filed August 1, 1921. Serial No. 488,832.

*To all whom it may concern:*

Be it known that I, HENRY S. GRACE, a citizen of the United States, residing at the city and county of San Francisco, and State of California, have invented certain new and useful Improvements in Resilient Vehicle Wheels, of which the following is a specification.

The hereinafter described invention is a wheel for use in connection with motor driven vehicles generally, although more particularly adapted for motor driven trucks or vehicles for the transportation of heavy loads, and the same is designed to take the place of the pneumatic and solid tired wheels at present employed with motor driven vehicles; the object of the invention being the production of a resilient wheel possessing the advantages of the pneumatic tired wheels in general use, and one in which the inflatable inner tube, and equally so, the expensive outer casing is dispensed with, and which may be successfully substituted for a solid tired wheel while preserving or maintaining the resilient features of a pneumatic tire, while at the same time providing a non-puncturable resilient tired rim member for a wheel structure.

In brief, the invention comprises a non-inflatable and non-puncturable rim attachment for vehicle wheels so constructed that when applied thereto there is provided a resilient wheel structure possessing all the advantages of an inflatable pneumatic tired wheel without the defects incident thereto, as for instance the employment of an inner inflatable tube, the puncture feature thereof, and the expensive outer casing associated therewith, while at the same time providing an inexpensive, efficient and durable resilient wheel.

To comprehend the invention reference should be had to the accompanying drawings illustrative of a preferred embodiment of the wheel structure, and wherein:—

Figure 3 is a vertical sectional view taken on the line 3—3 Figure 1 of the drawings.

Figure 4 is a vertical sectional view taken on the line 4—4 Figure 1 of the drawings.

Figure 5 is an end view of the inner element removed from the resilient member of the wheel structure.

Figure 6 is a perspective view of one of the drive studs.

Figure 1:
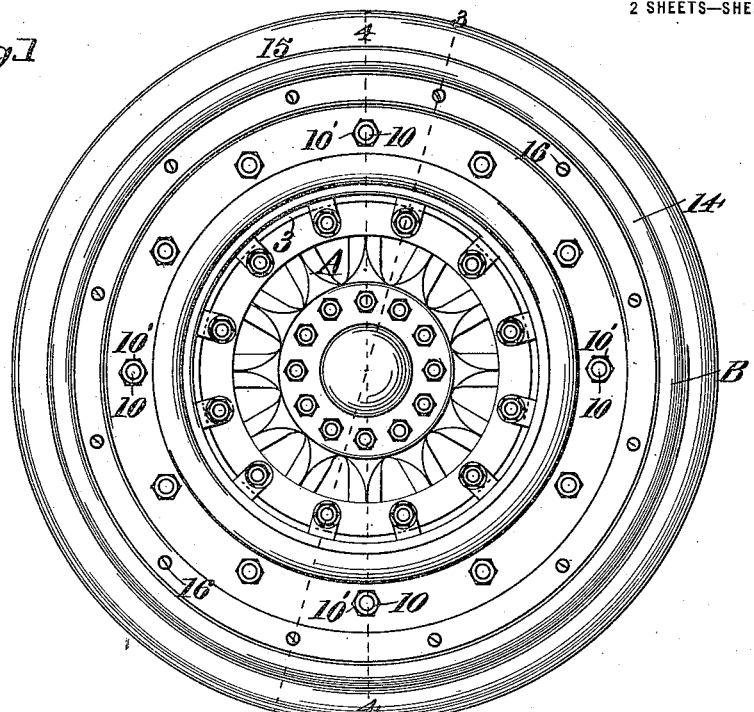
Figure 1 is a side elevation of the improved wheel structure.
Figure 2:
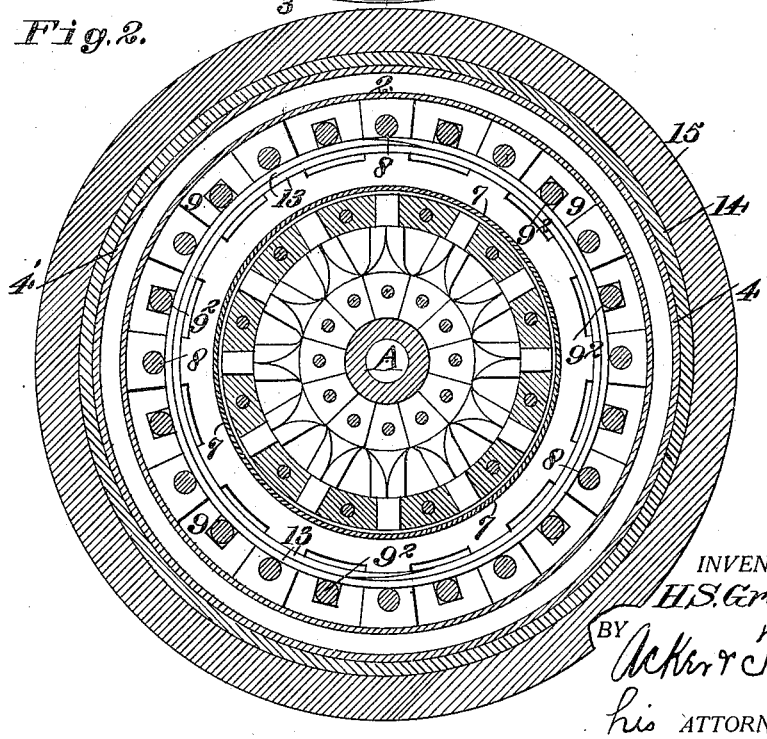
Figure 2 is a vertical sectional view taken on the line 2—2, Figure 3 of the drawings, said view illustrating the interior arrangement of the wheel structure.

The improved wheel structure comprises an inner rigid member A and an outer surrounding yielding resilient member B applied and detachably united thereto in any suitable manner, preferably as the detachable rims are secured to wheels for motor driven vehicles, that is by the usual lugs, bolts and securing nuts. However, the manner of uniting the outer yielding member to the inner rigid member of the wheel structure is an immaterial feature of the invention, inasmuch as various means of attachment may be employed—the one illustrated being merely a preferred form.

The yielding or flexible member B which surrounds and is detachably held to the inner rigid member A comprises two cylindrical telescopic elements, each in the present case being formed in halves or vertical sections held in spaced relation, the outer one of which is of larger diameter than the inner one and fits thereover for free vertical sliding movement, serving as a tread carrier of substantially U-shape in cross section.

The outer end flanged rim portions 2—2' of the side walls 3—3' of the inner cylindrical element are constructed to interlock one with the other, that is, the flanged rim portion 2 is formed with a series of spaced projecting male lugs 6 which fit snugly within the female lug seats 6' cut in the edge of the flange rim portion 2' of the side walls 3' when said members of the inner cylindrical element are in assembled position. These interlocked flanged portions form an outer rim for the said element, while the inner portion thereof is closed by a ring plate 7 which fits within the circumferential grooves or channels 7' formed in the inner face of the side walls 3—3' adjacent their inner extremities.

Within the inner cylindrical or supporting element of the flexible member of the wheel structure there is mounted circumferentially for free rotation a series of transversely disposed spaced roller studs 8, and in each face plate or side wall 3—3' of said element a series of circumferentially disposed spaced seats or cut-outs 9 are formed adjacent the outer periphery thereof. The outer rim member formed by the sections 2—2' has the depending flanges or walls 3—3' provided with the cut-out seat or sockets 9. These sockets receive the enlarged shelves 9' of the transversely disposed drive studs 9², which studs have threaded ends that pass through the side walls 5—5' and are united thereto by means of the nuts 10'. These drive studs hold the sections of the outer element of the flexible member of the wheel structure fastened one to the other, while at the same time they serve as a means for transmitting thereto the rotary movement of the inner cylindrical element, which is detachably secured to and carried by the inner member A of the wheel structure. Each drive stud 9² intermediate its shouldered portions 9' is formed round and they are positioned relative to the inner drum element so as to lie intermediate the transversely disposed roller studs 8.

In the inner face of each side wall of the outer slidable cylindrical elements of the resilient member B of the wheel structure is formed adjacent its lower or inner end portion, an annular seat or channel 11, into which is fitted a packing ring 12 in order to provide a running seal joint between the inner and outer faces of the cylindrical elements.

Within the inner cylindrical element of the resilient member and located radially within the roller studs 8 therein is positioned one or more split expansible compression rings 13, the ends of which are tapered and overlap. Preferably, two such expansible compression rings are employed, which are fitted within the said element under compression and in superposed relation, the lowermost one bearing frictionally against the under surface of the uppermost of said rings and such ring in turn bearing frictionally against the roller studs 8 and forming a cylindrical track therefor.

The outer of the cylindrical elements is carried by and slidable relative to the inner cylindrical element, the drive studs 9² thereof acting against the upper surface of the outermost spring or ring 13 during the vibratory movements of said outer element and the shouldered portion 9' of said drive studs at such times working within the cut-out or seat 9 of the inner cylindrical element, the depth of which seats or cut-outs is equal to the extreme vertical inward movement of the outer drum element. Under this construction, the split compression spring or springs within the inner cylindrical element sustains the load of the vehicle and gradually gives under compression to the vibrating movements of the outer sliding cylindrical element, the said element being thereby spring cushioned and normally held outwardly pressed under the tension of said spring or springs 13.

As the outer cylindrical element moves vertically under vibrating strains placed thereon, and to which it is subjected when the wheel is in use, the same moves slightly circumferentially relative to the inner element, and such movement is permitted by forming the seats or cut-outs 9 slightly wider than the shouldered portion of the drive studs 9'. During such movement of the outer element the drive studs frictionally bear against the upper surface of the expansion spring and impart a slight creep or forward movement thereto, and by so doing provide against crystallization, inasmuch as the bearing points are constantly changing relative to the roller studs and the drive studs.

Onto the flange rim surface 4' which constitutes an overhang of the side wall 5 of the outer slidable element of the resilient member of the wheel structure is shrunk an ordinary rim 14, to which is secured any suitable form of a tread 15.

The side walls 5—5' are held together by the drive bolts 9², and the side wall 5' is detachably secured to the depending flange 4² by the screw bolts 16 which extend through the flange 4². By removing one or more of the screw bolts 16 lubricant may be forced into the interior of the outer element of the resilient member for providing proper lubrication between the moving parts of the structure.

The inner rigid member A is of usual wheel construction, the yielding member B associated therewith constituting a resilient rim attachment therefor; it being understood that the spring cushion represented in the present case by the springs 13 constitute the yieldable compensating means for taking up the vibratory movements of the slidable section of the member B and for providing against shocks being transmitted to the fixed member A of the wheel structure as well as to restore the same to normal position, it being understood that the strength of compression spring or springs employed is proportionate to the load to be carried by the wheel structure and the type of motor vehicle to which it is to be applied.

The outer element of the resilient member of the wheel structure constitutes in the present case a tread carrier substantially U-shaped in cross section, and the inner element on which the same is telescopically mounted constitutes a supporting element therefor provided with interiorly arranged cushioning means for absorbing the vibratory movements of the U-shaped encircling tread carrier, while the drive studs serve to transmit rotary motion of the supporting element to the tread carrier, to prevent relative independent movement of the two circumferentially, and at the same time as the means for causing compression of the spring cushioning means. Such a constructed resilient member is believed to be new as applicable to wheels at present in use or in conjunction with a wheel structure.

Practical use of resilient wheels constructed as above set forth on a motor driven truck has demonstrated the efficiency and practicability thereof, and disclosed the same to be as elastic and easy riding as the ordinary pneumatic tired wheel.

The illustrated and described wheel structure discloses a preferred embodiment of the invention, but I do not wish to be understood as limiting the invention to the detailed construction of the working parts as shown and described, but on the contrary wish to be understood as claiming the invention as broadly as the state of the art warrants.

Having thus described my invention, what I claim as new and desire to secure by Letters Patent of the United States is:—

A resilient wheel comprising an inner rigid rim structure having a suitable hub, an outer rim surrounding said inner rim and composed of connected sections presenting a smooth outer surface and having side walls united with said inner rim, said outer rim sections being provided with a plurality of separated alined openings therein, circumferential springs disposed within said outer rim section and supported thereby, a plurality of transverse roller studs supported in said sides of the outer rim sections and impinging upon said circumferential springs, a rim carrying section having outer enclosing side walls slidably embracing said outer rim sections, a demountable rim carried by said section, transverse drive studs passing through said alined slots in the walls of the outer rim, said drive studs having enlarged end portions free for a radial movement in said slots, and threaded extensions on said drive studs passing through said side walls of said rim carrying section and united thereto to prevent a relative turning movement of said rim carrying section with respect to the outer rim.

In testimony whereof I have signed my name to this specification.

HENRY S. GRACE.